US012632594B2

(12) United States Patent
Husain

(10) Patent No.: US 12,632,594 B2
(45) Date of Patent: May 19, 2026

(54) USING EMBEDDINGS TO OBFUSCATE PRIVATE DATA IN RESOURCE ASSIGNMENTS

(71) Applicant: Capital One Services, LLC, McLean, VA (US)

(72) Inventor: Anna Husain, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 131 days.

(21) Appl. No.: 18/778,640

(22) Filed: Jul. 19, 2024

(65) Prior Publication Data

US 2026/0023875 A1 Jan. 22, 2026

(51) Int. Cl.
*G06F 21/62* (2013.01)

(52) U.S. Cl.
CPC ................................ *G06F 21/6245* (2013.01)

(58) Field of Classification Search
CPC .................................................... G06F 21/6245

USPC ............................................................ 726/27
See application file for complete search history.

(56) References Cited

U.S. PATENT DOCUMENTS 11,847,244 B1 * 12/2023 Madan ................... G06N 3/045
2024/0202360 A1 * 6/2024 Wang ..................... G06N 3/045

* cited by examiner

*Primary Examiner* — Jacob Lipman
(74) *Attorney, Agent, or Firm* — Foley & Lardner LLP

(57) ABSTRACT

Systems and methods for generating user recommendations based on restricted and accessible parameter sets are described herein. The system may transmit a request for a first parameter set. The system may cause a first plurality of embeddings to be generated using an embedding model based on the first parameter set. The system may retrieve a second parameter set. The system may provide the second parameter set to a duplicate embedding model for generating a second plurality of embeddings. The system may generate one or more parameter sets. The system may generate one or more indications corresponding to one or more resources associated with the one or more parameter sets.

20 Claims, 7 Drawing Sheets

200

100

200

300

310

| Parameter 312 | Restricted Value 314 |
|---|---|
| Parameter 1 | Value 1 |
| Parameter 2 | Value 2 |
| Parameter 3 | Value 3 |
| Parameter 4 | Value 4 |
| Parameter 5 | Value 5 |
| Parameter 6 | Value 6 |

320

| Parameter 322 | Accessible Value 324 |
|---|---|
| Parameter 1 | Value 7 |
| Parameter 2 | Value 8 |
| Parameter 7 | Value 9 |
| Parameter 8 | Value 10 |
| Parameter 9 | Value 11 |
| Parameter 10 | Value 12 |

| Resource Identifier 402 | Identifier 1 |
|---|---|

| Resource Parameter 404 | Resource-Specific Value 406 |
|---|---|
| Resource Parameter 1 | Value 1 |
| Resource Parameter 2 | Value 2 |
| Resource Parameter 3 | Value 3 |
| Resource Parameter 4 | Value 4 |
| Resource Parameter 5 | Value 5 |
| Resource Parameter 6 | Value 6 |

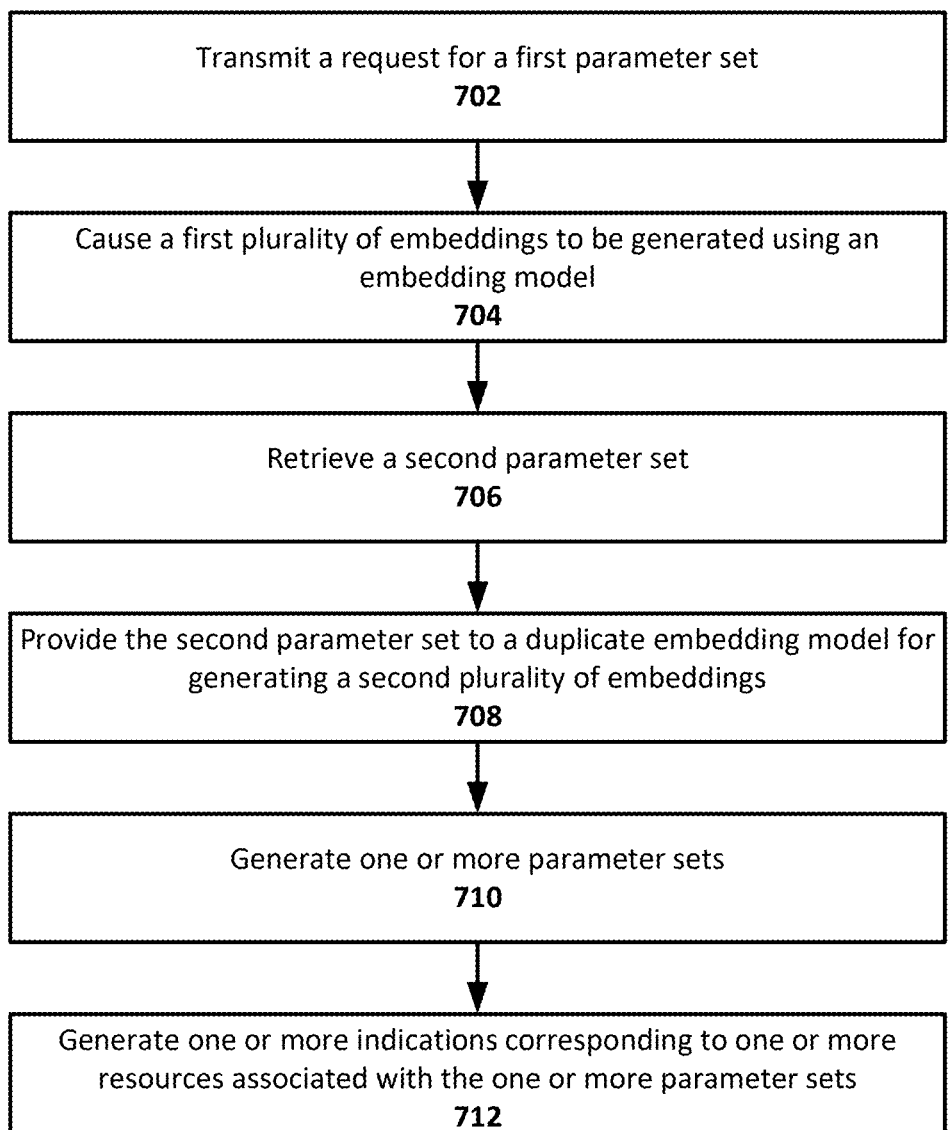

Transmit a request for a first parameter set
702

Cause a first plurality of embeddings to be generated using an embedding model
704

Retrieve a second parameter set
706

Provide the second parameter set to a duplicate embedding model for generating a second plurality of embeddings
708

Generate one or more parameter sets
710

Generate one or more indications corresponding to one or more resources associated with the one or more parameter sets
712

FIG. 7

USING EMBEDDINGS TO OBFUSCATE PRIVATE DATA IN RESOURCE ASSIGNMENTS

BACKGROUND

As information, data, and other digital resources continue to be produced, stored, and exchanged, so does the need persist to implement data management that is able to handle security concerns pre-emptively and proactively. For example, the amount of secure information stored within data centers has increased, with more and more sensitive information being exchanged between users, authenticators, and data storage entities. Biometric information, personal identifiable information, or other sensitive data may be collected, stored, and transmitted to various entities, such as in servers managed by medical providers or authentication services (e.g., for user identification, including at international border crossings and/or authentication terminals). Because such information is liable to be stolen and/or misused, conventionally, any loss of control of such sensitive information by an owner of such data may lead to disastrous consequences, including identity theft, false authentication, and loss of data. As such, data storage systems may benefit from the improved handling of secure data, such that any data is protected from malicious entities or other unauthorized third parties.

SUMMARY

In pre-existing high-performance computing (HPC) systems, a large quantity of secure data (e.g., associated with users of the HPC system) may be stored within an underlying file system. Much of this information may be hidden from the HPC system itself. For example, users may store confidential information within the file system, where such confidential information may include datasets that are unauthorized to be disseminated to system administrators, such as passwords, encryption keys, personally identifiable information, and/or other stored data that is private, secure, or personal. While such HPC systems may store this data in an inaccessible, secure manner, these systems do not enable the use or manipulation of this data, such as to make security decisions or to evaluate user activities or performance. The operations of pre-existing HPC systems are limited to operating on data or information that is accessible, rather than restricted. As such, an HPC system associated with a pre-existing security system may not have access to user activity data and, as such, such systems are unable to recommend or suggest possible solutions or technologies associated with the HPC system to improve the user's operation. For example, such pre-existing systems do not allow an HPC system to suggest possible processors, file systems, or memory devices that are consistent with the user's stored private data and/or data processing workflows and that may improve the user's data processing operations.

A pre-existing HPC system may evaluate users and/or process user data based on user permission. For example, a user may determine to decrypt or show previously hidden user information based on a toggle. However, the user permission process may be cumbersome and may require the user to mark specific permissions or file systems, thereby increasing the inefficiency of enabling the system to make predictions or recommendations to the user on the basis of restricted user information. In some cases, a pre-existing HPC system may convert inaccessible or tokenized (e.g., encrypted) data to an accessible form (e.g., by training a model to find a decryption key). However, such operations may undermine the security and trust associated with the confidentiality and privacy of the user data. Furthermore, such operations may be mathematically or computationally unfeasible. In many cases, an HPC system may include combinations of both restricted and accessible user data, which may not be straightforward to process in tandem to generate user recommendations.

To overcome these deficiencies in pre-existing systems, methods and systems disclosed herein enable access to electronic resources for users based on user information that is irrecoverable or secure and, therefore, directly inaccessible to the system. For example, in the context of an HPC system, the data evaluation system disclosed may request restricted user information that is associated with the user that is protected (e.g., embedded in an unreadable format), such as user information relating to the user's activities or attributes associated with the user's file system within the HPC cluster. Within the request, the data evaluation system may specify an embedding scheme or algorithm that the user may use to mask this protected data. The system may receive a first set of embeddings from the user, where these embeddings have been generated using this embedding scheme in response to the request. As such, the information received at the data evaluation system may be in an unreadable, protected format (e.g., through hashing or other suitable embedding schemes). In some implementations, the system may receive other user information that is accessible (e.g., not protected, previously embedded, or otherwise unreadable) and embed this information into another set of embeddings within the same embedding space (e.g., using the same embedding scheme).

In response to combining these restricted and accessible sets of embeddings, the system may provide the resulting dataset to a machine learning model that enables the determination of attributes of electronic resources, such as file systems or programs, that are compatible with the user's activities (e.g., with an authentication status of the user), on the basis of both restricted and accessible information associated with the user. As such, the system enables the generation of recommendations for resources associated with the HPC system that may be helpful to the user and/or accessible to the user (e.g., to improve the user's data processing workflows), without requiring the disclosure of any sensitive information associated with the user.

Based on evaluating embeddings of a common format for mixed accessible and inaccessible data through a machine learning model, the system may generate recommendations for electronic resources that may be useful or relevant to the user based on the information stored within the embeddings, without requiring the disclosure or decoding of the underlying restricted information. By doing so, the data evaluation system disclosed herein enables the processing, evaluation, and/or protection of mixed restricted and unrestricted data, improving the body of information available to the system while maintaining the security of any sensitive information.

In some aspects, the system may transmit a request for a first parameter set. For example, the system may transmit, to a device associated with a user, a request for a first parameter set. The first parameter set may include restricted parameters. As an illustrative example, the system may request information associated with a user that may be secure or restricted, such as private, sensitive, or confidential information associated with the user (e.g., personal identifiable information), which the system is unauthorized to access directly. The system may specify an embedding model (e.g., a protocol, algorithm, or scheme for masking, protecting, hashing, or tokenizing data such that it is unreadable to the system). By doing so, the system enables users to hide, mask, or otherwise protect sensitive data according to a specified, consistent embedding scheme to enable further evaluation and processing.

In some aspects, the system may cause a first plurality of embeddings to be generated using an embedding model. For example, in response to the request for the first parameter set, the system may cause a first plurality of embeddings to be generated using an embedding model associated with the user. Each embedding of the first plurality of embeddings may represent a corresponding restricted parameter that is inaccessible. As an illustrative example, the user may provide the first parameter set (e.g., the restricted parameter set) associated with the user to an embedding model, as indicated in the system's request, where the embedding model encodes the user's restricted or private data into an embedding space (e.g., a vector space). For example, the system may receive, from the user, vectors or hashes of a predetermined length (and/or of a particular dimensionality), where the elements of such vectors represent or describe features, attributes, or properties of the restricted parameter set (and, therefore, the underlying restricted/sensitive user information), but where such vectors are directly or indirectly indecipherable to the system.

In some aspects, the system may retrieve a second parameter set. For example, the system may retrieve a second parameter set associated with the user. Each parameter in the second parameter set may be accessible. For example, the system may retrieve, find, or receive a second parameter set that includes accessible parameters associated with the user. Such parameters may include information that is not hidden, hashed, or tokenized (e.g., is readable and/or otherwise accessible to the system). Such information may include text strings, values, or other information associated with the user that is not considered secure, restricted, or private. For example, these parameters may include the username or basic account information associated with a user of the HPC system.

In some aspects, the system may provide a second parameter set to a duplicate embedding model for generating a second plurality of embeddings. For example, the system may provide the second parameter set to a duplicate embedding model for generating a second plurality of embeddings, where each embedding of the second plurality of embeddings is in a same embedding space as the first plurality of embeddings. As an illustrative example, the system may generate vectors associated with the user's data, where such vectors encode the information within the second parameter set (e.g., accessible parameters) within the same embedding space (e.g., with the same dimensionality) as for the restricted parameters. By doing so, the system enables direct comparisons and parallel processing of embeddings associated with the restricted and accessible user data.

In some aspects, the system may generate one or more parameter sets. For example, the system may generate, using a machine learning model based on the first plurality of embeddings and the second plurality of embeddings, one or more parameter sets for the user, where each parameter set of the one or more parameter sets represents resource parameters of a corresponding resource. As an illustrative example, the system may determine sets of parameters, where each set of parameters describes an electronic resource (e.g., a file system, a hardware device, or a suggested process) that may be recommended, relevant to, or associated with a user. For example, the system may generate a list of electronic resources and associated performance indicators (e.g., processing speeds, storage sizes, or other suitable information) for generation of recommendations of the user based on the restricted and accessible information.

In some embodiments, the system may train the machine learning model to generate the resource parameter sets. For example, the system may obtain a plurality of training embeddings associated with a plurality of users. The system may obtain a plurality of training indications corresponding to the plurality of training embeddings, where each training indication of the plurality of training indications is associated with a particular resource of the one or more resources. The system may provide the plurality of training embeddings and the plurality of training indications to the machine learning model to train the machine learning model to generate output indications of resources based on input embeddings. As an illustrative example, the system may obtain embeddings associated with users, as well as indications of resources that were previously selected by these users (e.g., electronic resources previously used by these users). As such, the system may train the machine learning model to predict or categorize users based on electronic resources that are likely useful for these users based on previous users' behaviors.

In some aspects, the system may generate one or more indications corresponding to one or more resources associated with the one or more parameter sets. For example, the system may generate, for display on the device associated with the user, one or more indications corresponding to one or more resources associated with the one or more parameter sets. As an illustrative example, the system may cause the generation of graphical representations of the electronic resources determined to be compatible with the user (e.g., icons, buttons, or suitable user interface controls) to enable the user to select and/or interact with these electronic resources. For example, these buttons may include indications of file systems, particular HPC clusters/processors, or other such indications that are compatible with the user's previous activity and/or credentials, in order to enable user access to these systems according to the user's selection.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRA WINGS

FIG. 3 shows an illustrative schematic of a restricted parameter set and an accessible parameter set, in accordance with one or more embodiments.

FIG. 4 shows an illustrative schematic of a resource parameter set, in accordance with one or more embodiments.

FIG. 7 shows a flowchart of the basic operations involved in evaluating restricted and unrestricted parameter sets to generate user recommendations for electronic resources, in accordance with one or more embodiments.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
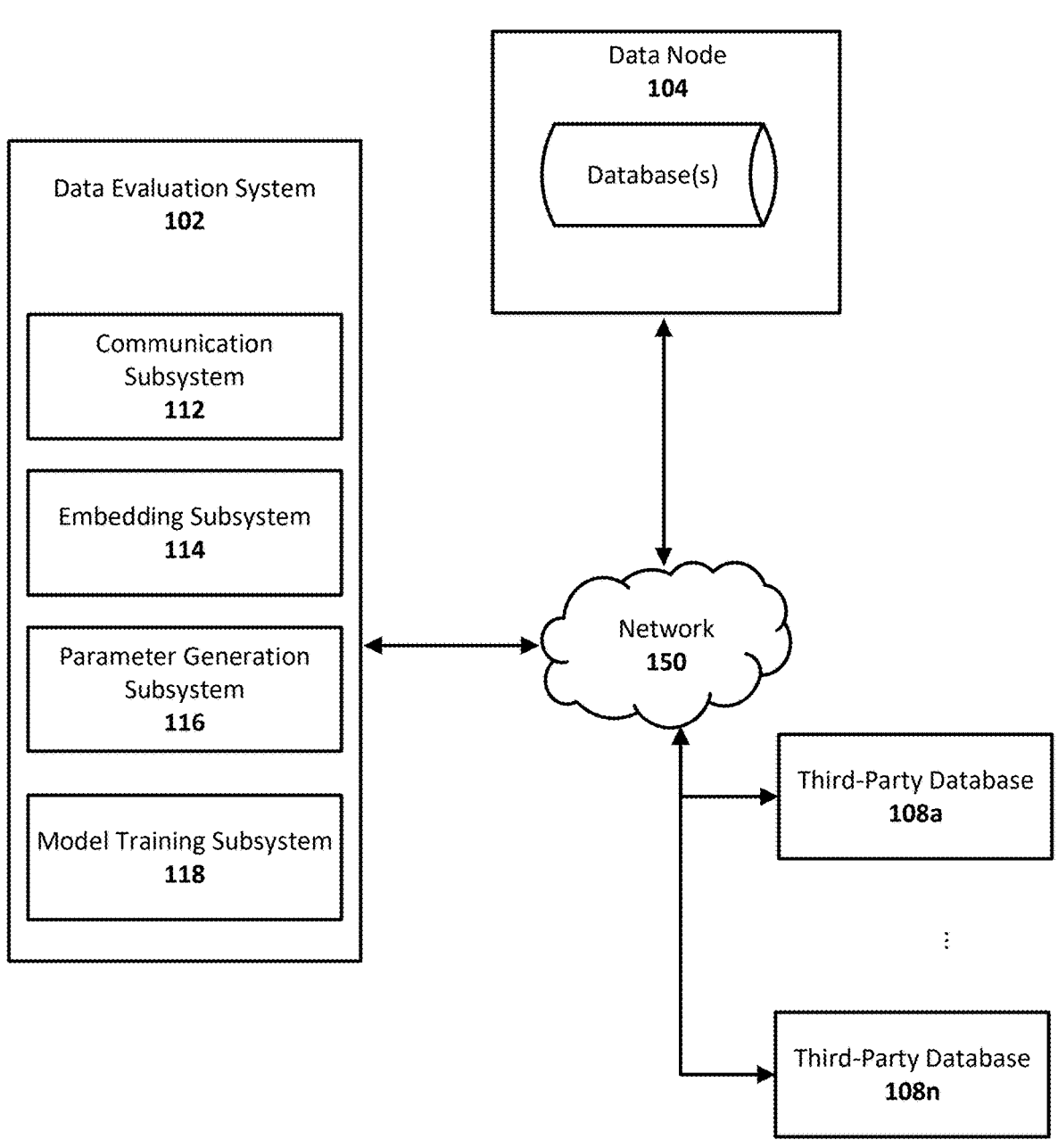
FIG. 1 shows an illustrative environment for characterizing restricted and unrestricted user data, in accordance with one or more embodiments.

FIG. 1 shows an illustrative environment for characterizing restricted and unrestricted user data, in accordance with one or more embodiments. Environment 100 may include data evaluation system 102, data node 104, and one or more third-party databases 108a-108n, any of which may be configured to communicate with network 150. Data evaluation system 102 may include software, hardware, or a combination of both and may reside on a physical server or a virtual server running on a physical computer system. In some embodiments, data evaluation system 102 may be configured on a user device (e.g., a laptop computer, smartphone, desktop computer, electronic tablet, or another suitable user device). Furthermore, data evaluation system 102 may reside on a server or node and/or may interface with breach detection systems either directly or indirectly.

Data node 104 may store various data, including one or more machine learning models, training data, parameter sets (e.g., restricted and/or accessible parameters, and/or resource parameter sets), embeddings, information relating to the embedding space, embedding model parameters, and/or other suitable data. Data node 104 may include software, hardware, or a combination of the two. In some embodiments, data evaluation system 102 and data node 104 may reside on the same hardware and/or the same virtual server or computing device. Network 150 may be a local area network, a wide area network (e.g., the internet), or a combination of the two. Third-party databases 108a-108n may reside on client devices (e.g., desktop computers, laptops, electronic tablets, smartphones, servers, and/or other computing devices that interact with network 150, cloud devices, or servers).

Data evaluation system 102 may receive user activity logs, parameter sets (e.g., restricted and/or accessible), resource parameters, user selections, and other suitable data from one or more devices. Data evaluation system 102 may receive such data using communication subsystem 112, which may include software components, hardware components, or a combination of both. For example, communication subsystem 112 may include a network card (e.g., a wireless network card and/or a wired network card) that is associated with software to drive the card and enables communication with network 150. In some embodiments, communication subsystem 112 may also receive data from and/or communicate with data node 104 or another computing device. Communication subsystem 112 may receive data, such as activity logs, parameter sets, embeddings, and/or indications of resources, such as indications pertaining to HPC system resources and/or credit card loan terms or other suitable financial products. Communication subsystem 112 may communicate with embedding subsystem 114, parameter generation subsystem 116, and/or model training subsystem 118.

In some embodiments, data evaluation system 102 may include embedding subsystem 114. embedding subsystem 114 may perform tasks that encode data, such as activity log data or other user data (e.g., including restricted/tokenized/encrypted data) into embeddings, such as one or more vectors. For example, the embedding subsystem 114 may generate a vector embedding of a user's parameter set utilizing a matrix operation and/or a machine learning algorithm (e.g., a natural language processing algorithm, such as word2vec or doc2vec). Embedding subsystem 114 may include software components, hardware components, or a combination of both. For example, embedding subsystem 114 may include software components or may include one or more hardware components (e.g., processors) that are able to execute operations for generating embeddings from parameter sets, such as accessible parameters associated with a user's bank account or financial information (e.g., tax return information from a filing application). Embedding subsystem 114 may directly access data, systems, or nodes associated with third-party databases 108a-108n and may be able to transmit data to such nodes. Additionally or alternatively, embedding subsystem 114 may receive data from and/or send data to communication subsystem 112, parameter generation subsystem 116, and/or model training subsystem 118.

Parameter generation subsystem 116 may execute tasks relating to the generation of parameters, such as resource parameters associated with electronic resources. For example, parameter generation subsystem 116 may generate sets of parameters relating to electronic resources, such as file systems, processors, memory devices, bank account parameters, credit card loan terms, and/or other suitable information. Parameter generation subsystem 116 may include software components, hardware components, or a combination of both. For example, in some embodiments, parameter generation subsystem 116 may receive embeddings associated with restricted and/or accessible parameters associated with a user's activity and/or attributes. Based on these embeddings, the parameter generation subsystem 116 may determine parameters associated with resources to which the associated user may be associated or compatible (e.g., recommendations of suitable loan terms for the user on the basis of private and public data associated with the user). Data from parameter generation subsystem 116 may be accessible to communication subsystem 112, embedding subsystem 114, and/or model training subsystem 118. Additionally or alternatively, parameter generation subsystem 116 may receive information or data from communication subsystem 112, embedding subsystem 114, and/or model training subsystem 118.

Model training subsystem 118 may execute tasks relating to training machine learning models (e.g., including embedding models). For example, model training subsystem 118 may receive, obtain, or generate training data associated with embeddings and corresponding user parameters to train an embedding model (and/or its duplicate) to generate embeddings from parameter data. Additionally or alternatively, model training subsystem 118 may enable training a machine learning model to generate resource parameters based on restricted or accessible parameters associated with a user. As such, model training subsystem 118 may include software components such as application programming interface (API) calls, hardware components, or a combination of both. Model training subsystem 118 may interface with other subsystems and/or nodes of environment 100, such as data node 104, third-party databases 108a-108n (e.g., via network 150), communication subsystem 112, embedding subsystem 114, and/or parameter generation subsystem 116.

Figure 2:
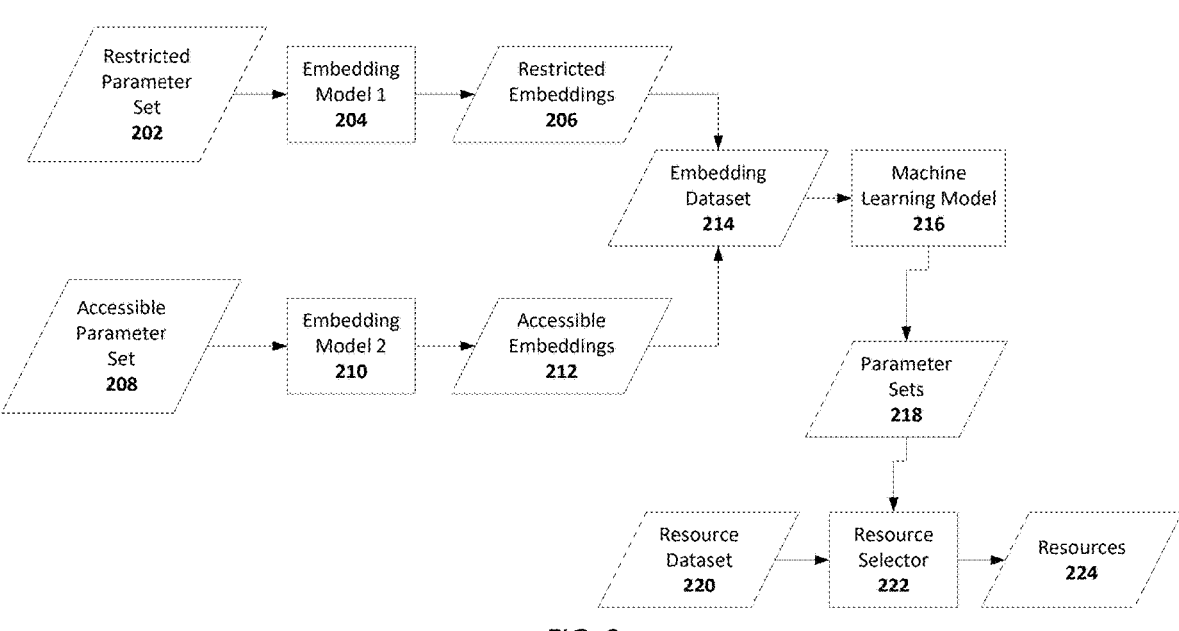
FIG. 2 shows an illustrative flow for providing access to electronic resources for users based on restricted and accessible parameters, in accordance with one or more embodiments.

FIG. 2 shows an illustrative flow for providing access to electronic resources for users based on restricted and accessible parameters, in accordance with one or more embodiments. For example, flow 200 enables data evaluation system 102 to request restricted parameter set 202 (e.g., associated with a user device). Data evaluation system 102 may cause the user to provide restricted parameter set 202 to first embedding model 204 to generate restricted embeddings 206 and transmit these restricted embeddings to data evaluation system 102 (e.g., through communication subsystem 112). Additionally or alternatively, data evaluation system 102 may receive or retrieve accessible parameter set 208 associated with the user and provide this parameter set to second embedding model 210 to generate accessible embeddings 212 associated with the user. Data evaluation system 102 may combine restricted embeddings 206 and accessible embeddings 212 to generate embedding dataset 214. The data evaluation system 102 may provide embedding dataset 214 to machine learning model 216 to generate parameter sets 218 associated with resources. In some implementations, data evaluation system 102 determines which resources of resource dataset 220 are compatible with parameter sets 218 based on providing parameter sets 218 to resource selector 222. Accordingly, data evaluation system 102 may generate an indication of resources 224 as a recommendation to the user.

In some embodiments, data evaluation system 102, through communication subsystem 112, may transmit a request for a first parameter set (e.g., restricted parameter set 202, as shown in FIG. 2). For example, data evaluation system 102 may transmit, to a device associated with a user, a request for a first parameter set, where the first parameter set includes restricted parameters. As an illustrative example, data evaluation system 102 may request user information characterizing the user and/or the user's accounts. For example, the user information may include restricted, secure, or sensitive information. The request may include an indication of a particular embedding model, such as an embedding scheme, protocol, or algorithm for converting data to an unreadable format. To illustrate, the indication of the embedding model may include a uniform resource locator (URL) to a program for generating secure embeddings (e.g., unreadable representations of data) based on the requested sensitive data. In response to this request, data evaluation system 102 may receive unreadable, embedded forms of the first parameter set (e.g., from a user device through network 150). As such, the system may request information that may be advantageous for determining or recommending resources that are relevant to the user based on the user's previous activity and/or characteristics associated with the user profile (e.g., bank account information, loan payment history, credit score information, or other similar financial information), while maintaining the security and privacy of the information.

FIG. 3 shows an illustrative schematic of a restricted parameter set and an accessible parameter set, in accordance with one or more embodiments. For example, schematic 300 includes data structure 310 representing a restricted parameter set and data structure 320 representing an accessible parameter set. As an illustrative example, the restricted parameter set may include parameters 312 and associated restricted values 314. The accessible parameter set may include parameters 322 and associated accessible values 324. By receiving, retrieving, or obtaining parameters associated with users, data evaluation system 102 enables evaluation of user information (e.g., associated with user activity) to generate recommendations for the user.

A parameter set may include a set of values, information, or data associated with a user. A parameter may include information associated with a user (or any other suitable information). Such parameters may be accessible if they are readable, accessible, or otherwise available to the system (e.g., without encryption, tokenization, or any other hiding). For example, parameters may include information associated with a user account within an HPC computing system, such as a username, an account creation date, a list of file systems to which the user has access, or other similar information. Additionally or alternatively, parameters may include information associated with the financial activities and/or health of a user (e.g., a customer of a banking or financial product). For example, parameters may include information associated with a user, such as a credit score, a total amount within one or more financial accounts associated with the user (e.g., within a checking, savings, or CD account). A parameter may include a value associated with a frequency or regularity of the user's payments (e.g., a regularity of paying off balance on credit cards associated with the user). In some implementations, a parameter includes a numerical value (e.g., associated with a number of credit cards associated with the user). In some implementations, the parameter set may include user activity data, including a user activity log (e.g., a log of financial transactions associated with the user, including associated transaction values or amounts). As such, a parameter set may include sufficient information to evaluate a user's behavior (e.g., with respect to an electronic banking system) and provide recommendations for associated products (e.g., associated financial products).

A restricted parameter set may include a set of values, information, or data associated with a user that is considered to be private, sensitive, or associated with access controls. For example, a restricted parameter set may include parameters associated with sensitive information, such as personal identifiable information (PII), personal health information (PHI), or sensitive financial information. For example, a restricted parameter set may include data or numerical values associated with information provided to a tax filing application, where such information is legally required to be kept private. As an illustrative example, the restricted parameter set may include the user's geographical location, a number of dependents, verified income, or other income (e.g., including self-employment income, investment income, retirement income, social security benefits, unemployment compensation, alimony, awards, prizes, gambling winnings, and/or canceled debts). In some implementations, the restricted parameter set may include information relating to childcare expenses, student loan interest information, child tax credit information, earned income credit information, secondary education credits, credit for retirement plan contributions, medical expenses, mortgage interest, and/or charitable contributions. As such, the restricted parameter set may include information of a personal, private, and/or secure nature that may not be received at the system in a system-readable form. By receiving such information in an embedded form, the system may process such data to generate recommendations (e.g. for financial products for the user) without compromising the security and/or privacy of the user's information.

In some embodiments, data evaluation system 102, through embedding subsystem 114, may cause a first plurality of embeddings to be generated using an embedding model. For example, in response to the request for the first parameter set, data evaluation system 102 may cause (e.g., send a command to a user device associated with the user) a first plurality of embeddings (e.g., restricted embeddings 206) to be generated using an embedding model associated with the user, where each embedding of the first plurality of embeddings represents a corresponding restricted parameter that is inaccessible. As an illustrative example, data evaluation system 102 enables a user device to provide the restricted parameters associated with the restricted parameter set to a vector encoding model (e.g., first embedding model 204) or another suitable embedding model (e.g., a hash algorithm) to generate a vector or another portable representation of the restricted parameter set. As an illustrative example, data evaluation system 102 may generate a data structure where each element of the data structure represents a given parameter set projected on an axis of a pre-determined dimensionality for the embedding (e.g., as defined by an embedding space). By doing so, data evaluation system 102 enables comparison between both restricted and unrestricted parameter sets associated with the user by placing both types of parameter sets within the same format.

An embedding may include a representation of information within a pre-defined space. For example, an embedding may include a numerical representation of information, words, phrases, numerical values, or other information associated with parameters (e.g., within a vector representation, a hash, a token, or another mathematical object). Embeddings may include hashes, tokens, or vectors that capture relationships and/or features associated with a given parameter and/or parameter set (e.g., with respect to an embedding space). An embedding space may include an indication and/or a framework for representing embeddings (e.g., an axis system, coordinate system, an embedding scheme, and/or a dimensionality associated with the embeddings). For example, axes, directions, lengths, and/or magnitudes associated with a vector space corresponding to the embedding space may represent various features, attributes, and/or values of parameters associated with the underlying data. In some implementations, an embedding encodes restricted and/or accessible information in the same manner such that the embedding is comparable to another embedding within the same embedding space but is not readable to the system. For example, a restricted embedding may represent restricted parameters (e.g., parameters that are sensitive, private, or confidential and are to be hidden or masked from unauthorized entities) and accessible parameters (e.g., parameters that are associated with previously known, accessible, and/or public information).

In some implementations, the embeddings may include or encode information that cannot be transformed back to a readable form. For example, each embedding within the first plurality of embeddings is in a format that does not enable that embedding to be transformed back into the corresponding restricted parameter. As an illustrative example, an embedding may be generated through a hashing algorithm or another process for irreversibly generating representations of sensitive information (e.g., through tokenization of sensitive information). An accessible embedding may represent accessible parameters (e.g., parameters that are available and/or accessible to the system to read) but may not be transformed back into a readable form following generation of the associated accessible embeddings. The system may combine restricted and accessible embeddings (and/or any other suitable embeddings) to generate an embedding data set that includes all such embeddings.

Data evaluation system 102, through embedding subsystem 114, may generate embeddings through an embedding model (e.g., the first embedding model 204 and/or the second embedding model 210). An embedding model may include a machine learning model, algorithm, and/or process that enables generation of embeddings (e.g., within a format that is unreadable to the system) based on parameter sets. For example, an embedding model may include natural language processing algorithms capable of processing natural language associated with parameters (e.g., associated with descriptions of parameters, credit scores, and/or names of financial products) into an embedding space (e.g., to a vector representation associated with a particular coordinate system). As an illustrative example, an embedding model may include neural networks or other unsupervised learning algorithms. Additionally or alternatively, an embedding model may include supervised tools or algorithms capable of transforming data (e.g., associated with restricted or accessible parameters) to associated embeddings. For example, an embedding model may include a hashing algorithm or a tokenization algorithm for generating unreadable or non-parsable representations of sensitive or accessible information associated with a user.

The embedding model may include parameters, protocols, programs, or other processes, methods, or components capable of generating embeddings from input parameters. In some implementations, data evaluation system 102 may store the embedding model itself (e.g., within data node 104). Additionally or alternatively, data evaluation system 102 may store containers or build instructions that are sufficient for building the embedding model. For example, the embedding model may transmit (e.g., via the request for the first parameter set) a set of build instructions, or a URL to download these build instructions, such that the user may compile the embedding model on a local system. Data evaluation system 102 may store a duplicate of this embedding model (e.g., within data node 104) such that embeddings received from the user in response to the request are consistent with embeddings generated (e.g., from accessible parameters) by data evaluation system 102. For example, data evaluation system 102, through embedding subsystem 114, may generate embeddings through a duplicate of the embedding model associated with the user (e.g., housed on an associated user device). Such a duplicate embedding model (e.g., of a first embedding model that receives restricted parameters as inputs) may include an embedding model that generates embeddings within the same embedding space as the user's embedding model, and may receive accessible parameters as inputs (e.g., rather than restricted parameters). As such, data evaluation system 102 may generate embeddings based on accessible data that is associated with the user, where such embeddings may be directly compared or related to embeddings received from the user.

In some implementations, the user may include an indication of an embedding model. The indication of the embedding model may include an identifier of an embedding model (e.g., a model associated with embedding restricted parameters of a certain type). For example, an indication of an embedding model may include an identifier of an embedding algorithm and/or tokenization method for generating embeddings from restricted parameters. For example, an embedding model may be associated with a particular hashing algorithm (e.g., configured to accept, as input, parameter sets and to generate, as output, associated hashes). In some implementations, the indication of the embedding model may include an indication of a URL or a suitable method for downloading the embedding model and/or compilation instructions associated with the embedding model. For example, the indication of the embedding model may include a compressed folder including compilation instructions for the embedding model and/or an executable file that includes the embedding model itself. As such, data evaluation system 102 enables the user to generate protected embeddings of sensitive data locally, without transmitting any of this sensitive data to external entities.

In some embodiments, data evaluation system 102 may receive embeddings generated by a mobile device associated with the user. For example, data evaluation system 102 may receive, in response to the request, the first plurality of embeddings, where the first plurality of embeddings is generated by the device associated with the user using the embedding model. As an illustrative example, the user may encode and submit the embeddings to data evaluation system 102 through communication subsystem 112 (e.g., by generating embeddings of restricted parameters using the indicated embedding model). As such, data evaluation system 102 confers improved control over data and privacy associated with user data to the user, thereby improving the security of the data evaluation system HPC or financial system.

In some implementations, data evaluation system 102 may train the embedding model based on training parameter sets associated with multiple users. For example, data evaluation system 102, through model training subsystem 118, may obtain training parameter set data including a plurality of training parameter sets corresponding to a plurality of users. Data evaluation system 102 may obtain embedded training data in the same embedding space, where the embedded training data corresponds to the training parameter set data in the same embedding space. Data evaluation system 102 may provide the training parameter set data and the embedded training data to the embedding model to train the embedding model to generate output embedded data based on input parameter set data.

In some implementations, the embedding model may be trained to accept hashed values. For example, data evaluation system 102, via embedding subsystem 114, may train a hashing model to generate the training data from unhashed/accessible information associated with the training data. Data evaluation system 102 may obtain training data associated with the plurality of users. Data evaluation system 102 may provide the training data to a hashing model to generate a hashed version of the training data. Data evaluation system 102 may store the encrypted version of the training data as the training parameter set data. To illustrate, a user may determine not to provide sensitive information directly to the indicated encoding model. As such, the user may determine to hash the data or tokenize the data (e.g., according to a tokenization algorithm) prior to generating the first set of embeddings. As such, data evaluation system 102 may train the embedding model to handle tokenized/hashed data to generate the same embeddings as for untokenized data.

As an illustrative example, data evaluation system 102 may receive unhashed/accessible information (e.g., training data) associated with previous users' hashed parameters (e.g., training parameter set data, including private information that the user device has hashed for privacy or security reasons, such as information within other users' tax returns that have been shared with the system with the users' permission). The system may generate embeddings based on this unhashed/accessible information to generate the associated embedded training data (e.g., by providing this accessible information to the second embedding model). Based on this information, data evaluation system 102, through model training subsystem 118, may train the first embedding model to generate embeddings such that the same data, when hashed or tokenized to generate restricted parameters, is associated with the same generated embeddings as for the same unhashed/accessible information. By doing so, data evaluation system 102 enables direct comparability between embeddings based on hashed or otherwise masked parameters and accessible parameters through the embedding model.

In some implementations, data evaluation system 102 may generate hashed training data (e.g., based on training data) using a hashing model. A hashing model may include a model that is capable of transforming, hashing, modifying, and/or tokenizing data such that the resulting data is unreadable or hidden from a given system. As an illustrative example, a hashing model may generate hashed data (e.g., through a hashing algorithm). For example, the encryption model may accept a given parameter value as an input and generate a hashed version of the parameter as an output based on a hashing algorithm (e.g., an identity hash function, a trivial hash function, a folding function, a mid-squares function, division hashing, algebraic coding, or folding). In some implementations, data evaluation system 102 may generate tokenized representations of such parameters, where sensitive data is replaced with non-sensitive substitutes that preserve the type and/or length of the data. For example, the encryption algorithm may generate a token associated with a parameter that preserves particular attributes or features of the parameter such that information is preserved within the tokenized version (i.e., the restricted version) of the unrestricted/accessible parameter, thereby enabling further processing of the sensitive information without requiring knowledge of the underlying information.

In some embodiments, data evaluation system 102, through communication subsystem 112, may retrieve a second parameter set (e.g., accessible parameter set 208) associated with the user (e.g., that is associated with accessible information). For example, data evaluation system 102 may retrieve a second parameter set associated with the user. Each parameter in the second parameter set may be accessible. As an illustrative example, data evaluation system 102 may retrieve information associated with the user that is accessible and/or public (e.g., not sensitive). For example, such parameters associated with the second parameter set may include information previously provided to or determined by the data evaluation system, such as financial information known to the system (e.g., a credit score, a total amount of money within an associated electronic bank account, and/or a history of paying off debt). By receiving such information, data evaluation system 102 may evaluate this information to devise recommendations for the user in tandem with information associated with restricted data (e.g., private or sensitive data acquired from another system, such as a tax filing program).

In some embodiments, data evaluation system 102, through embedding subsystem 114, may provide the second parameter set to a duplicate embedding model to generate a second plurality of embeddings. For example, data evaluation system 102 may provide, to a duplicate of the embedding model, the accessible parameter set for generating a plurality of accessible embeddings, where each embedding of the plurality of accessible embeddings is in a same embedding space as the plurality of restricted embeddings. As an illustrative example, data evaluation system 102 may provide the unrestricted, accessible user data (e.g., associated with financial information already stored within data node 104) to the duplicate embedding model to generate embeddings of this information that are directly comparable with the embeddings corresponding to the restricted parameter set. By doing so, data evaluation system 102 enables comparison and evaluation of both restricted (e.g., private) and unrestricted information for the generation of user recommendations.

In some implementations, data evaluation system 102 may combine the first set of embeddings and the second set of embeddings into an embedding dataset. For example, data evaluation system 102 may combine the first plurality of embeddings and the second plurality of embeddings into an embedding dataset. As an illustrative example, data evaluation system 102 may generate a data structure that includes embeddings of the private data associated with the user and the previously known data associated with the user within the same encoding space, to enable comparisons and evaluations of this user data across both types of data.

FIG. 4 shows an illustrative schematic of a resource parameter set, in accordance with one or more embodiments. For example, schematic 400 includes a data structure associated with a particular resource (e.g., associated with resource identifier 402). The data structure may include a resource parameter set associated with this particular resource, including resource parameters 404 and corresponding resource-specific values 406. By storing and evaluating user data (e.g., users' parameter sets), data evaluation system 102 enables the generation of recommendations for the user concerning available or suitable electronic resources on the basis of these resource parameters associated with the corresponding electronic resources.

In some embodiments, data evaluation system 102 (e.g., through parameter generation subsystem 116 of FIG. 1) generates parameter sets associated with resources based on the embeddings for the user. For example, data evaluation system 102 may generate, using a machine learning model based on the first plurality of embeddings and the second plurality of embeddings, one or more parameter sets for the user, where each parameter set of the one or more parameter sets represents resource parameters of a corresponding resource. As an illustrative example, data evaluation system 102 may generate a set of parameters that indicate loan terms and/or credit cards that are suitable for a user (e.g., based on the user's credit score, payment history, and/or other information encoded within the restricted and/or accessible embeddings). As such, data evaluation system 102 enables recommendations of possible financial products or other electronic resources (e.g., associated with HPC cluster systems or components) on the basis of hidden and accessible data.

A resource (e.g., one of resources 224) may include an electronic, technological, and/or technical resource, including financial resources provided through computational or electronic means. For example, a resource may include a credit card and/or a line of credit accessible through a credit card, loan, and/or electronic bank account. In some implementations, a resource includes electronic resources associated with an HPC cluster (e.g., associated network, hardware, or software components). For example, a user's access to a given resource may be dependent on the user's credentials, payment history, or other requirements. As such, data evaluation system 102 enables evaluation of a user for determination of the suitability or qualification for the candidate for a given financial product, even if some data is otherwise inaccessible (e.g., due to being associated with a private data source, such as a tax filing program).

A resource parameter may include values and/or tokens that represent attributes, features, requirements, or characteristics of a given resource. For example, a resource parameter may include quantitative values associated with a resource, such as a financial product. The resource parameter may include an indication of an interest rate (e.g., an Annual Percentage Rate/Yield), a term for the loan and/or bond (e.g., a time), and/or another similar parameter associated with the resource. In some implementations, the resource parameter may include information relating to an electronic resource, such as technical specifications associated with components of a computational system. A resource parameter may include requirements associated with providing access to the resource for a given user, such as a minimum credit score associated with the associated financial product. As such, a resource parameter may include information that characterizes the suitability of a given resource for a user, enabling data evaluation system 102 to evaluate the user accordingly.

Data evaluation system 102 may include a machine learning model (e.g., an artificial intelligence model). The machine learning model may include a classification model (e.g., for classifying embeddings into parameter sets associated with different resources), or another model that may receive embeddings as inputs and generate parameter sets (e.g., associated with resources) as outputs. For example, training the machine learning model may include updating weights (e.g., associated with neurons of a neural network), such as through backpropagation of error, to facilitate the update process. For example, the machine learning model may include an input layer, one or more hidden layers, and an output layer.

In some embodiments, data evaluation system 102 may (e.g., through parameter generation subsystem 116) train the machine learning model to generate resource parameter sets based on embeddings. For example, data evaluation system 102 may obtain a plurality of training embeddings associated with a plurality of users. Data evaluation system 102 may obtain a plurality of training indications corresponding to the plurality of training embeddings. Each training indication of the plurality of training indications may be associated with a particular resource of the one or more resources. Data evaluation system 102 may provide the plurality of training embeddings and the plurality of training indications to the machine learning model to train the machine learning model to generate output indications of resources based on input embeddings. For example, data evaluation system 102 may obtain training embeddings associated with users (e.g., as discussed previously), which may correspond to restricted and/or accessible parameters associated with users' accounts (e.g., bank accounts or financial health). Data evaluation system 102 may obtain corresponding training indications (e.g., indicating resource identifiers for resources and/or associated resource parameters associated with the resources) for resources associated with the same users (e.g., financial resources, such as credit card accounts, bonds, or other financial products, that are opened by these users). As such, the system may train the machine learning model to generate recommendations for users that are relevant and/or suitable for the users based on embeddings associated with the users' previous behavior and/or characteristics.

In some embodiments, data evaluation system 102 may (e.g., through parameter generation subsystem 116) obtain the plurality of training indications by obtaining associated resource parameter sets and storing these as the training indications. For example, data evaluation system 102 may obtain a plurality of resource parameter sets. Each resource parameter set of the plurality of resource parameter sets includes a corresponding set of numerical values associated with a particular resource of the one or more resources. Data evaluation system 102 may store the plurality of resource parameter sets as the plurality of training indications. As an illustrative example, data evaluation system 102 may train the machine learning model to generate parameter sets that describe resources (e.g., by describing a loan term, an Annual Percentage Rate/Yield, or a minimum credit score), thereby enabling the machine learning model to generate recommendations for financial product parameters that are likely suitable for the associated user.

In some embodiments, data evaluation system 102 may generate parameter sets using the machine learning model based on a user evaluation metric. For example, data evaluation system 102 may determine, using the second parameter set, a user activity log for the user, where the user activity log includes a plurality of activities associated with the user. Data evaluation system 102 may generate, based on the user activity log, a user evaluation metric for the user, where the user evaluation metric indicates an evaluation of user activity. Data evaluation system 102 may generate, using the machine learning model based on the user evaluation metric, the one or more parameter sets for the user. As an illustrative example, data evaluation system 102 may access a user activity log that includes information relating to past transactions of the user (e.g., including previous instances associated with the user paying off balances on credit cards and/or previous financial accounts started by the user). Based on this information, data evaluation system 102 may generate a user evaluation metric (e.g., by calculating or retrieving a credit score for the user based on the users' previous activity). As such, data evaluation system 102 may generate recommendations for financial products for the user based on the user evaluation metric (e.g., the credit score) to ensure that any resources suggested to the user are suitable for the user's credentials and are consistent with the user's behavior.

A user activity log may include information relating to activities of the user. For example, a user activity log may include information associated with activities and associated timestamps associated with their execution. An activity may include an action, task, process, or another suitable operation performed by or associated with the user. For example, an activity may include a payment, transaction, or communication by the user with another entity (e.g., the data evaluation system itself). An activity may include transactions of the user at merchants (e.g., at shops), including indications of products and/or services purchased by the user through these transactions. An activity may include the user's interactions with file systems or other components of a computing system. In some implementations, a user activity log includes indications of such activities (e.g., identifiers of such activities), as well as corresponding timestamps. As such, data evaluation system 102 enables evaluation of the user's past behavior in order to generate recommendations for financial products (or other electronic resources) that are suitable for the user.

A user evaluation metric may include an indication of an evaluation of a user, such as an extent of a user's technical or financial responsibility (e.g., through an evaluation of the user's activity). For example, a user evaluation metric includes a credit score, or another metric for evaluating a user's risk and/or benefit to a given financial system. For example, a user evaluation metric may be calculated based on determining a risk or probability that the user will make a particular payment on a given credit card or financial product account. In some implementations, a user evaluation metric may include an indication and/or an evaluation of the account age of any user accounts (e.g., bank accounts, loans, or other user accounts), as well as other activities associated with the user's account. By determining a user evaluation metric, data evaluation system 102 enables holistic evaluation of the user's behavior to ensure the suitability of recommended resources.

In some embodiments, data evaluation system 102 may modify the resources generated for display to the user based on the user evaluation metric. For example, data evaluation system 102 may determine, using the second parameter set, a user activity log associated with the user. Data evaluation system 102 may generate, based on the user activity log, a user evaluation metric for the user, where the user evaluation metric indicates an evaluation of user activity. Data evaluation system 102 may determine, based on the one or more parameter sets, one or more corresponding threshold evaluation metrics, where each threshold evaluation metric of the one or more corresponding threshold evaluation metrics is associated with a particular resource of the one or more resources. Data evaluation system 102 may compare the user evaluation metric with each threshold evaluation metric of the one or more corresponding threshold evaluation metrics. Based on comparing the user evaluation metric with each threshold evaluation metric of the one or more corresponding threshold evaluation metrics, data evaluation system 102 may determine a subset of resources compatible with the user. Data evaluation system 102 may generate the one or more indications, where the one or more indications correspond to the subset of resources. As an illustrative example, data evaluation system 102 may determine which resources generated by the machine learning model are associated with a minimum credit score (e.g., or another suitable threshold evaluation metric) and generate only indications of these resources for display on the user interface. By doing so, data evaluation system 102 may ensure the suitability of resources recommended to the user.

In some embodiments, data evaluation system 102 may determine if there is duplicate data within the embedding dataset and, accordingly, select one (e.g., corresponding to the accessible data) for further analysis. For example, data evaluation system 102 may determine that a first embedding of the first plurality of embeddings matches a second embedding of the second plurality of embeddings. Based on determining that the first embedding of the first plurality of embeddings matches the second embedding of the second plurality of embeddings, Data evaluation system 102 may provide the first embedding to the machine learning model in lieu of providing the second embedding to the machine learning model. Data evaluation system 102 may generate, using the machine learning model based on the first embedding, the one or more parameter sets for the user. As an illustrative example, data evaluation system 102 may determine that the same information (e.g., associated with the user's address) is encoded in both the first set of embeddings and the second set of embeddings. Based on this determination, data evaluation system 102 may determine to choose only one of these embeddings for further analysis (e.g., to generate the parameter sets corresponding to resources through the machine learning model). By doing so, data evaluation system 102 prevents weighing the same information more heavily than other information within the machine learning model, thereby improving the quality of recommendations for the user.

In some embodiments, data evaluation system 102 may determine that a first embedding matches a second embedding based on determining a distance between the two embeddings within the embedding space. For example, data evaluation system 102 may determine a distance between the first embedding and the second embedding, where the distance indicates a similarity of the first embedding and the second embedding in the same embedding space. Data evaluation system 102 may compare the distance with a threshold distance. Based on determining that the distance is less than the threshold distance, data evaluation system 102 may determine that the first embedding matches the second embedding. As an illustrative example, data evaluation system 102 may generate a distance within a Euclidean coordinate system associated with the embedding space, where the distance represents a relative dissimilarity between the two embeddings (e.g., according to a cosine similarity and/or a Euclidean distance algorithm). As such, data evaluation system 102 enables determination of whether duplicate or similar information is provided within the embeddings received or retrieved by the system, thereby improving the efficiency and accuracy of the system in generating recommendations for resources associated with the user.

In some embodiments, data evaluation system 102 may determine to choose the other embedding (e.g., corresponding to the restricted data as opposed to the accessible data) for generation of the parameter sets. For example, data evaluation system 102 may determine that a first embedding of the first plurality of embeddings matches a second embedding of the second plurality of embeddings. Based on determining that the first embedding of the first plurality of embeddings matches the second embedding of the second plurality of embeddings, data evaluation system 102 may provide the first embedding to the machine learning model in lieu of providing the second embedding to the machine learning model. Data evaluation system 102 may generate, using the machine learning model based on the first embedding, the one or more parameter sets for the user.

In some implementations, data evaluation system 102 may generate indications of the resources for display and further selection of the user. For example, data evaluation system 102 may generate, for display on the device associated with the user, one or more indications corresponding to one or more resources associated with the one or more parameter sets.

Figure 5:
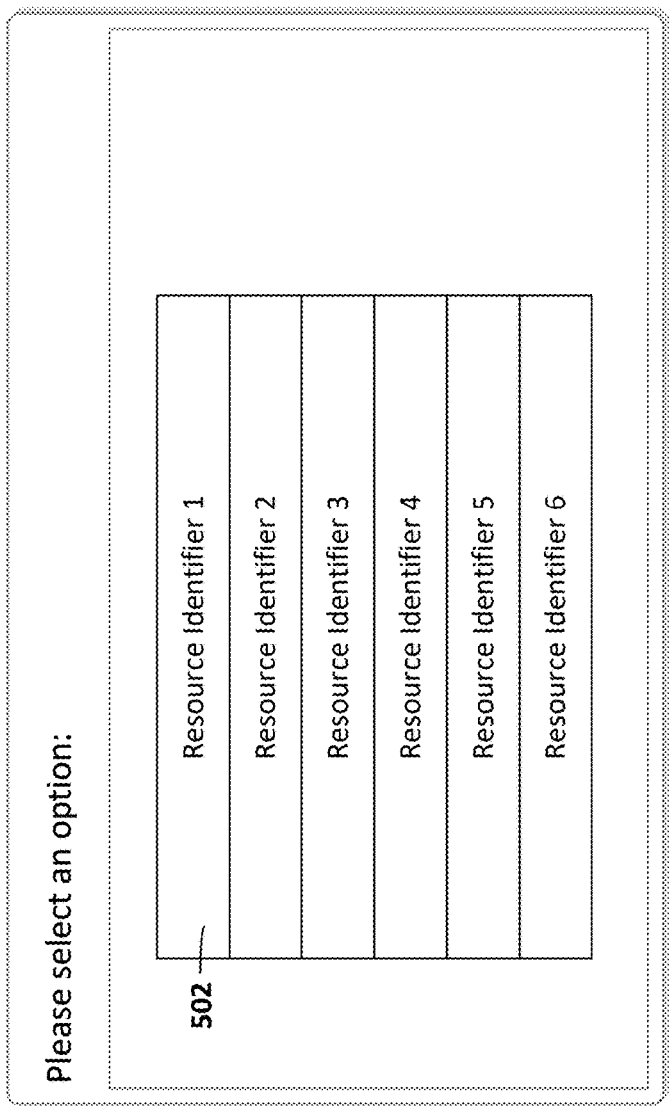
FIG. 5 shows an illustrative schematic of a graphical user interface (GUI) enabling a user to select an indication of a recommended resource, in accordance with one or more embodiments.

FIG. 5 shows an illustrative schematic of a graphical user interface (GUI) enabling a user to select an indication of a recommended resource, in accordance with one or more embodiments. For example, schematic 500 shows a user interface for display of generated indications of resources (e.g., indication 502) associated with resources that are accessible to the user. Data evaluation system 102 may receive a selection from the user (e.g., by receiving an indication of a tap or click on the indication as generated on the GUI); based on this selection, data evaluation system 102 may provide access to the resource for the user.

An indication of a resource may include a graphical representation of the resource (e.g., a resource identifier associated with the resource). The indication may include one or more parameters associated with the resource (e.g., including an Annual Percentage Yield/Rate associated with a loan or other suitable information). By enabling a user to select a resource, data evaluation system 102 enables provision of relevant resources to users based on both secure (e.g., inaccessible) and accessible information associated with the user, thereby improving the accuracy of associated recommendations.

In some embodiments, data evaluation system 102 may receive a selection associated with the indications of resources and provide access to the resource accordingly. For example, data evaluation system 102 may transmit to the device associated with the user the one or more indications. Based on receiving from the device associated with the user a selection of a first indication of the one or more indications, providing, for the user, access to a first resource associated with the first indication. As an illustrative example, data evaluation system 102 may generate or provide access to a form associated with applying for an associated financial resource (and/or enable the user to have access to this resource, such as a line of credit directly, through an indication associated with the user's bank account). In some implementations, data evaluation system 102 may enable users to gain access to particular file systems, computational resources, or other information or electronic resources based on this selection.

Figure 6:
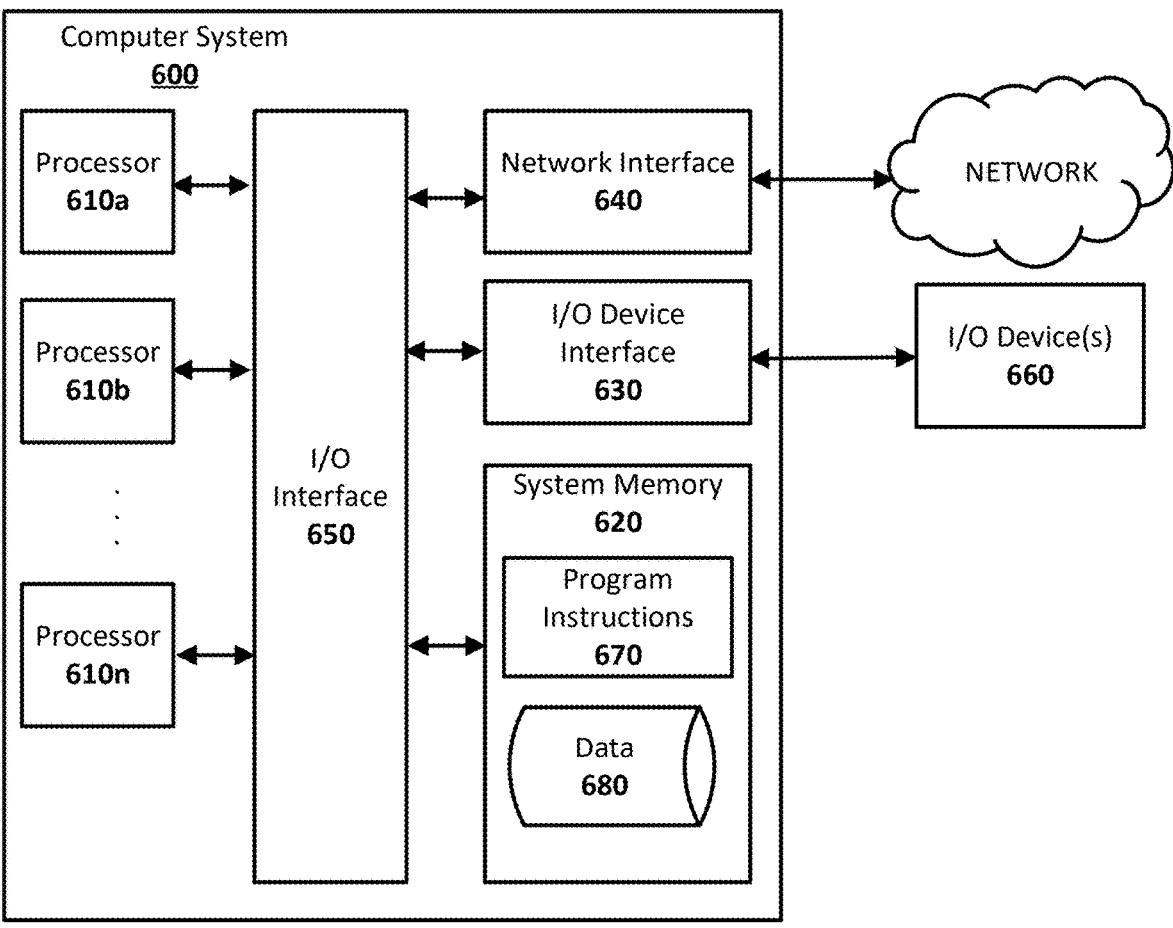
FIG. 6 shows an example computing system that may be used in accordance with some embodiments of this disclosure, in accordance with one or more embodiments.

FIG. 6 shows an example computing system that may be used in accordance with some embodiments of this disclosure. In some instances, computing system 600 is referred to as a computer system 600. A person skilled in the art would understand that those terms may be used interchangeably. The components of FIG. 6 may be used to perform some or all operations or generate, transmit, or handle all data discussed in relation to FIGS. 1-5. Furthermore, various portions of the systems and methods described herein may include or be executed on one or more computer systems similar to computing system 600. Further, processes and modules described herein may be executed by one or more processing systems similar to that of computing system 600.

Computing system 600 may include one or more processors (e.g., processors 610a-610n) coupled to system memory 620, an input/output (I/O) device interface 630, and a network interface 640 via an I/O interface 650. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and I/O operations of computing system 600. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 620). Computing system 600 may be a uni-processor system including one processor (e.g., processor 610a), or a multi-processor system including any number of suitable processors (e.g., processors 610a-610n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus may also be implemented as, special purpose logic circuitry, for example, an FPGA (field-programmable gate array) or an ASIC (application-specific integrated circuit). Computing system 600 may include a plurality of computing devices (e.g., distributed computer systems) to implement various processing functions.

I/O device interface 630 may provide an interface for connection of one or more I/O devices 660 to computer system 600. I/O devices may include devices that receive input (e.g., from a user) or output information (e.g., to a user). I/O devices 660 may include, for example, a GUI presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 660 may be connected to computer system 600 through a wired or wireless connection. I/O devices 660 may be connected to computer system 600 from a remote location. I/O devices 660 located on remote computer systems, for example, may be connected to computer system 600 via a network and network interface 640.

Network interface 640 may include a network adapter that provides for connection of computer system 600 to a network. Network interface 640 may facilitate data exchange between computer system 600 and other devices connected to the network. Network interface 640 may support wired or wireless communication. The network may include an electronic communication network, such as the internet, a local area network (LAN), a wide area network (WAN), a cellular communications network, or the like.

System memory 620 may be configured to store program instructions 670 or data 680. Program instructions 670 may be executable by a processor (e.g., one or more of processors 610a-610n) to implement one or more embodiments of the present techniques. Program instructions 670 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one or more computer processors located locally at one site or distributed across multiple remote sites and interconnected by a communication network.

System memory 620 may include a tangible program carrier having program instructions stored thereon. A tangible program carrier may include a non-transitory, computer-readable storage medium. A non-transitory, computer-readable storage medium may include a machine-readable storage device, a machine-readable storage substrate, a memory device, or any combination thereof. A non-transitory, computer-readable storage medium may include non-volatile memory (e.g., flash memory, ROM, PROM, EPROM, EEPROM), volatile memory (e.g., random access memory (RAM), static random access memory (SRAM), synchronous dynamic RAM (SDRAM)), bulk storage memory (e.g., CD-ROM and/or DVD-ROM, hard drives), or the like. System memory 620 may include a non-transitory, computer-readable storage medium that may have program instructions stored thereon that are executable by a computer processor (e.g., one or more of processors 610a-610n) to cause the subject matter and the functional operations described herein. A memory (e.g., system memory 620) may include a single memory device and/or a plurality of memory devices (e.g., distributed memory devices).

I/O interface 650 may be configured to coordinate I/O traffic between processors 610a-610n, system memory 620, network interface 640, I/O devices 660, and/or other peripheral devices. I/O interface 650 may perform protocol, timing, or other data transformations to convert data signals from one component (e.g., system memory 620) into a format suitable for use by another component (e.g., processors 610a-610n). I/O interface 650 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 600, or multiple computer systems 600 configured to host different portions or instances of embodiments. Multiple computer systems 600 may provide for parallel or sequential processing/execution of one or more portions of the techniques described herein.

Those skilled in the art will appreciate that computer system 600 is merely illustrative and is not intended to limit the scope of the techniques described herein. Computer system 600 may include any combination of devices or software that may perform or otherwise provide for the performance of the techniques described herein. For example, computer system 600 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, a Global Positioning System (GPS), or the like. Computer system 600 may also be connected to other devices that are not illustrated or may operate as a stand-alone system. In addition, the functionality provided by the illustrated components may, in some embodiments, be combined in fewer components, or distributed in additional components. Similarly, in some embodiments, the functionality of some of the illustrated components may not be provided, or other additional functionality may be available.

FIG. 7 shows a flowchart of the basic operations involved in evaluating restricted and unrestricted parameter sets to generate user recommendations for electronic resources, in accordance with one or more embodiments. For example, process 700 enables generation of recommendations for users based on restricted and/or accessible data associated with the user, thereby maintaining the security and privacy of data while leveraging such data to provide accurate, efficient user recommendations.

At 702, process 700 (e.g., using one or more components described above) enables computer system 600 to transmit a request for a first parameter set. For example, computer system 600 may transmit (e.g., through network interface 640), to a device associated with a user, a request for a first parameter set. The first parameter set may include a representation of restricted parameters. As an illustrative example, computer system 600 may transmit an indication of the embedding model (e.g., an identifier of an embedding or hashing algorithm or a link to compilation instructions of the encoding model) such that the user may mask or protect sensitive user information prior to providing this information to computer system 600. For example, the request may indicate requested user data that may be subject to privacy regulations, such as financial or personal information associated with a user's tax filings (e.g., including income information, dependent information, or other personal information entered within a tax filing electronic application).

At 704, process 700 (e.g., using one or more components described above) enables computer system 600 to cause a first plurality of embeddings to be generated using an embedding model. For example, in response to the request for the first parameter set, computer system 600 may cause a first plurality of embeddings to be generated using an embedding model associated with the user. Each embedding of the first plurality of embeddings may represent a corresponding restricted parameter that is inaccessible. As an illustrative example, computer system 600 may receive, through network interface 640, embeddings that correspond to an unreadable version of sensitive user information generated on the user's device using the indicated encoding model. Computer system 600 may store these embeddings within system memory 620 via I/O interface 650 as data 680. For example, computer system 600 may receive, from the user device, vector representations of the sensitive information associated with the user within an embedding space, thereby encoding the information in a secure, inaccessible medium using an embedding model for further processing. Computer system 600 may store these vector representations within the system memory 620 (e.g., as data 680). Such information may encode sensitive financial information associated with the user (e.g., associated with the user's tax filings), without allowing access or recovery of such information.

At 706, process 700 (e.g., using one or more components described above) enables computer system 600 to retrieve a second parameter set. For example, computer system 600 may retrieve a second parameter set associated with the user, where each parameter in the second parameter set is accessible. As an illustrative example, computer system 600 may retrieve information associated with the user that is accessible to the system (e.g., including non-sensitive or non-private data, such as basic demographic data, credit scores, or other publicly available data). Computer system 600 may retrieve such information through network interface 640 and may store this information within system memory 620 through I/O interface 650. By doing so, computer system 600 may further process user information (e.g., including user behavior) to determine a recommendation for a suitable resource for the user (e.g., a suitable financial product for the user, such as a loan that is compatible with the user's information).

At 708, process 700 (e.g., using one or more components described above) enables computer system 600 to provide the second parameter set to a duplicate embedding model for generating a second plurality of embeddings. For example, computer system 600 may provide the second parameter set to a duplicate embedding model for generating a second plurality of embeddings. Each embedding of the second plurality of embeddings may be in a same embedding space as the first plurality of embeddings. As an illustrative example, computer system 600 may generate a second plurality of embeddings within the same embedding space using processors 610a-610n and program instructions 670, where the second plurality of embeddings represent the accessible user data within a mathematical framework that enables direct comparison with the restricted user data. By doing so, data evaluation system 102 enables accurate, effective evaluation of embeddings that represent user behavior and characteristics for improved recommendations of resources that are consistent with the user.

At 710, process 700 (e.g., using one or more components described above) enables computer system 600 to generate one or more parameter sets. For example, computer system 600 may generate, using a machine learning model based on the first plurality of embeddings and the second plurality of embeddings, one or more parameter sets for the user. Each parameter set of the one or more parameter sets may represent resource parameters of a corresponding resource. As an illustrative example, computer system 600 may generate sets of parameters associated with financial products (e.g., including minimum credit score requirements, Annual Percentage Yield values, or terms of loans) based on information encoded within the generated embeddings (e.g., using a machine learning model associated with program instructions 670 and executed using processors 610a-610n). By doing so, computer system 600 may generate recommendations for financial products and other electronic resources that are suitable for a user based on the user's sensitive and known information, thereby improving the accuracy of such recommendations.

At 712, process 700 (e.g., using one or more components described above) enables computer system 600 to generate one or more indications corresponding to one or more resources associated with the one or more parameter sets. For example, computer system 600 may generate, for display on the device associated with the user (e.g., through network interface 640), one or more indications corresponding to one or more resources associated with the one or more parameter sets. As an illustrative example, computer system 600 may generate graphical indications of loans or other financial products, including indications of associated or relevant loan terms or loan parameters. As such, computer system 600 enables provision of resources to users on the basis of restricted and accessible data associated with user behavior.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 7.

The above-described embodiments of the present disclosure are presented for purposes of illustration and not of limitation, and the present disclosure is limited only by the claims that follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising: transmitting, to a device associated with a user, a request for a restricted parameter set, wherein the restricted parameter set comprises restricted parameters that are unable to be read by the system, and wherein the request comprises an indication of an embedding model; in response to the request for the restricted parameter set, receiving, from the device associated with the user, a plurality of restricted embeddings generated using the embedding model, wherein each embedding of the plurality of restricted embeddings represents a corresponding restricted parameter associated with the user, and wherein each restricted embedding is in a format that does not enable that restricted embedding to be transformed back into the corresponding restricted parameter; retrieving an accessible parameter set comprising an accessible plurality of parameters associated with the user, wherein each accessible parameter is enabled to be read by the system; providing, to a duplicate of the embedding model, the accessible parameter set for generating a plurality of accessible embeddings, wherein each embedding of the plurality of accessible embeddings is in a same embedding space as the plurality of restricted embeddings; combining the plurality of restricted embeddings and the plurality of accessible embeddings into an embedding dataset; based on providing the embedding dataset to a machine learning model, generating one or more parameter sets for the user, wherein each parameter set of the one or more parameter sets represents resource parameters for one or more resources; and generating, for display on a user device, one or more indications corresponding to the one or more resources associated with the one or more parameter sets.

2. A method comprising: transmitting, to a device associated with a user, a request for a first parameter set, wherein the first parameter set comprises restricted parameters; in response to the request for the first parameter set, causing a first plurality of embeddings to be generated using an embedding model associated with the user, wherein each embedding of the first plurality of embeddings represents a corresponding restricted parameter that is inaccessible; retrieving a second parameter set associated with the user, wherein each parameter in the second parameter set is accessible; providing the second parameter set to a duplicate embedding model for generating a second plurality of embeddings, wherein each embedding of the second plurality of embeddings is in a same embedding space as the first plurality of embeddings; generating, using a machine learning model based on the first plurality of embeddings and the second plurality of embeddings, one or more parameter sets for the user, wherein each parameter set of the one or more parameter sets represents resource parameters of a corresponding resource; and generating, for display on the device associated with the user, one or more indications corresponding to one or more resources associated with the one or more parameter sets.

3. A method comprising: transmitting, to a device associated with a user, a request for a first parameter set, wherein the first parameter set comprises restricted parameters; in response to the request for the first parameter set, causing a first plurality of embeddings to be generated using an embedding model, wherein each embedding of the first plurality of embeddings represents a corresponding restricted parameter that is inaccessible; retrieving a second parameter set associated with the user; providing the second parameter set to a duplicate embedding model for generating a second plurality of embeddings, wherein each embedding of the second plurality of embeddings is in a same embedding space as the first plurality of embeddings; generating, using a machine learning model based on the first plurality of embeddings and the second plurality of embeddings, one or more parameter sets for the user, wherein each parameter set of the one or more parameter sets represents resource parameters of a corresponding resource; and generating, for display on the device associated with the user, one or more indications corresponding to one or more resources associated with the one or more parameter sets.

4. The method of any one of the preceding embodiments, further comprising: transmitting to the device associated with the user the one or more indications; and based on receiving from the device associated with the user a selection of a first indication of the one or more indications, providing, for the user, access to a first resource associated with the first indication.

5. The method of any one of the preceding embodiments, wherein each embedding within the first plurality of embeddings is in a format that does not enable that embedding to be transformed back into the corresponding restricted parameter.

6. The method of any one of the preceding embodiments, further comprising: combining the first plurality of embeddings and the second plurality of embeddings into an embedding dataset.

7. The method of any one of the preceding embodiments, wherein causing the first plurality of embeddings to be generated using the embedding model associated with the user further comprises: receiving in response to the request the first plurality of embeddings, wherein the first plurality of embeddings is generated by the device associated with the user using the embedding model.

8. The method of any one of the preceding embodiments, further comprising: obtaining training parameter set data comprising a plurality of training parameter sets corresponding to a plurality of users; obtaining embedded training data in the same embedding space, wherein the embedded training data corresponds to the training parameter set data in the same embedding space; and providing the training parameter set data and the embedded training data to the embedding model to train the embedding model to generate output embedded data based on input parameter set data.

9. The method of any one of the preceding embodiments, wherein obtaining the training parameter set data comprises: obtaining training data associated with the plurality of users; providing the training data to a hashing model to generate a hashed version of the training data; and storing the hashed version of the training data as the training parameter set data.

10. The method of any one of the preceding embodiments, further comprising: obtaining a plurality of training embeddings associated with a plurality of users; obtaining a plurality of training indications corresponding to the plurality of training embeddings, wherein each training indication of the plurality of training indications is associated with a particular resource of the one or more resources; and providing the plurality of training embeddings and the plurality of training indications to the machine learning model to train the machine learning model to generate output indications of resources based on input embeddings.

11. The method of any one of the preceding embodiments, wherein obtaining the plurality of training indications comprises: obtaining a plurality of resource parameter sets, wherein each resource parameter set of the plurality of resource parameter sets includes a corresponding set of numerical values associated with a particular resource of the one or more resources; and storing the plurality of resource parameter sets as the plurality of training indications.

12. The method of any one of the preceding embodiments, further comprising: determining, using the second parameter set, a user activity log for the user, wherein the user activity log includes a plurality of activities associated with the user; generating, based on the user activity log, a user evaluation metric for the user, wherein the user evaluation metric indicates an evaluation of user activity; and generating, using the machine learning model based on the user evaluation metric, the one or more parameter sets for the user.

13. The method of any one of the preceding embodiments, further comprising: determining, using the second parameter set, a user activity log associated with the user; generating, based on the user activity log, a user evaluation metric for the user, wherein the user evaluation metric indicates an evaluation of user activity; determine, based on the one or more parameter sets, one or more corresponding threshold evaluation metrics, wherein each threshold evaluation metric of the one or more corresponding threshold evaluation metrics is associated with a particular resource of the one or more resources; comparing the user evaluation metric with each threshold evaluation metric of the one or more corresponding threshold evaluation metrics; based on comparing the user evaluation metric with each threshold evaluation metric of the one or more corresponding threshold evaluation metrics, determining a subset of resources compatible with the user; and generating the one or more indications, wherein the one or more indications correspond to the subset of resources.

14. The method of any one of the preceding embodiments, further comprising: determining that a first embedding of the first plurality of embeddings matches a second embedding of the second plurality of embeddings; based on determining that the first embedding of the first plurality of embeddings matches the second embedding of the second plurality of embeddings, providing the first embedding to the machine learning model in lieu of providing the second embedding to the machine learning model; and generating, using the machine learning model based on the first embedding, the one or more parameter sets for the user.

15. The method of any one of the preceding embodiments, wherein determining that the first embedding matches the second embedding comprises: determining a distance between the first embedding and the second embedding, wherein the distance indicates a similarity of the first embedding and the second embedding in the same embedding space; comparing the distance with a threshold distance; and based on determining that the distance is less than the threshold distance, determining that the first embedding matches the second embedding.

16. The method of any one of the preceding embodiments, further comprising: determining that a first embedding of the first plurality of embeddings matches a second embedding of the second plurality of embeddings; based on determining that the first embedding of the first plurality of embeddings matches the second embedding of the second plurality of embeddings, providing the first embedding to the machine learning model in lieu of providing the second embedding to the machine learning model; and generating, using the machine learning model based on the first embedding, the one or more parameter sets for the user.

17. One or more tangible, non-transitory, computer-readable media storing instructions that, when executed by a data processing apparatus, cause the data processing apparatus to perform operations comprising those of any of embodiments 1-16.

18. A system comprising one or more processors; and memory storing instructions that, when executed by the processors, cause the processors to effectuate operations comprising those of any of embodiments 1-16.

19. A system comprising means for performing any of embodiments 1-16.

What is claimed is:

1. A system for providing user access to electronic resources based on embeddings for irrecoverable, secure user data, the system comprising:

one or more processors; and one or more non-transitory, computer-readable media storing instructions that, when executed by the one or more processors, cause operations comprising:

transmitting, to a device associated with a user, a request for a restricted parameter set, wherein the restricted parameter set comprises restricted parameters that are unable to be read by the system, and wherein the request comprises an indication of an embedding model;

in response to the request for the restricted parameter set, receiving, from the device associated with the user, a plurality of restricted embeddings generated using the embedding model, wherein each embedding of the plurality of restricted embeddings represents a corresponding restricted parameter associated with the user, and wherein each restricted embedding is in a format that does not enable that restricted embedding to be transformed back into the corresponding restricted parameter;

retrieving an accessible parameter set comprising an accessible plurality of parameters associated with the user, wherein each accessible parameter is enabled to be read by the system;

providing, to a duplicate of the embedding model, the accessible parameter set for generating a plurality of accessible embeddings, wherein each embedding of the plurality of accessible embeddings is in a same embedding space as the plurality of restricted embeddings;

combining the plurality of restricted embeddings and the plurality of accessible embeddings into an embedding dataset;

based on providing the embedding dataset to a machine learning model, generating one or more parameter sets for the user, wherein each parameter set of the one or more parameter sets represents resource parameters for one or more resources; and generating, for display on a user device, one or more indications corresponding to the one or more resources associated with the one or more parameter sets.

2. A method for providing user access to electronic resources based on embeddings for irrecoverable, secure user data, the method comprising:

transmitting, to a device associated with a user, a request for a first parameter set, wherein the first parameter set comprises restricted parameters;

in response to the request for the first parameter set, causing a first plurality of embeddings to be generated using an embedding model associated with the user, wherein each embedding of the first plurality of embeddings represents a corresponding restricted parameter that is inaccessible;

retrieving a second parameter set associated with the user, wherein each parameter in the second parameter set is accessible;

providing the second parameter set to a duplicate embedding model for generating a second plurality of embeddings, wherein each embedding of the second plurality of embeddings is in a same embedding space as the first plurality of embeddings;

generating, using a machine learning model based on the first plurality of embeddings and the second plurality of embeddings, one or more parameter sets for the user, wherein each parameter set of the one or more parameter sets represents resource parameters of a corresponding resource; and generating, for display on the device associated with the user, one or more indications corresponding to one or more resources associated with the one or more parameter sets.

3. The method of claim 2, further comprising:

transmitting to the device associated with the user the one or more indications; and based on receiving from the device associated with the user a selection of a first indication of the one or more indications, providing, for the user, access to a first resource associated with the first indication.

4. The method of claim 2, wherein each embedding within the first plurality of embeddings is in a format that does not enable that embedding to be transformed back into the corresponding restricted parameter.

5. The method of claim 2, further comprising combining the first plurality of embeddings and the second plurality of embeddings into an embedding dataset.

6. The method of claim 2, wherein causing the first plurality of embeddings to be generated using the embedding model associated with the user further comprises:

receiving in response to the request the first plurality of embeddings, wherein the first plurality of embeddings is generated by the device associated with the user using the embedding model.

7. The method of claim 2, further comprising:

determining, using the second parameter set, a user activity log for the user, wherein the user activity log includes a plurality of activities associated with the user;

generating, based on the user activity log, a user evaluation metric for the user, wherein the user evaluation metric indicates an evaluation of user activity; and generating, using the machine learning model based on the user evaluation metric, the one or more parameter sets for the user.

8. The method of claim 2, further comprising:

determining, using the second parameter set, a user activity log associated with the user;

generating, based on the user activity log, a user evaluation metric for the user, wherein the user evaluation metric indicates an evaluation of user activity;

determining, based on the one or more parameter sets, one or more corresponding threshold evaluation metrics, wherein each threshold evaluation metric of the one or more corresponding threshold evaluation metrics is associated with a particular resource of the one or more resources;

comparing the user evaluation metric with each threshold evaluation metric of the one or more corresponding threshold evaluation metrics;

based on comparing the user evaluation metric with each threshold evaluation metric of the one or more corresponding threshold evaluation metrics, determining a subset of resources compatible with the user; and generating the one or more indications, wherein the one or more indications correspond to the subset of resources.

9. The method of claim 2, further comprising:

determining that a first embedding of the first plurality of embeddings matches a second embedding of the second plurality of embeddings;

based on determining that the first embedding of the first plurality of embeddings matches the second embedding of the second plurality of embeddings, providing the first embedding to the machine learning model in lieu of providing the second embedding to the machine learning model; and generating, using the machine learning model based on the first embedding, the one or more parameter sets for the user.

10. The method of claim 2, further comprising:

obtaining training parameter set data comprising a plurality of training parameter sets corresponding to a plurality of users;

obtaining embedded training data in the same embedding space, wherein the embedded training data corresponds to the training parameter set data in the same embedding space; and providing the training parameter set data and the embedded training data to the embedding model to train the embedding model to generate output embedded data based on input parameter set data.

11. The method of claim 10, wherein obtaining the training parameter set data comprises:

obtaining training data associated with the plurality of users;

providing the training data to a hashing model to generate a hashed version of the training data; and storing the hashed version of the training data as the training parameter set data.

12. The method of claim 2, further comprising:

obtaining a plurality of training embeddings associated with a plurality of users;

obtaining a plurality of training indications corresponding to the plurality of training embeddings, wherein each training indication of the plurality of training indications is associated with a particular resource of the one or more resources; and providing the plurality of training embeddings and the plurality of training indications to the machine learning model to train the machine learning model to generate output indications of resources based on input embeddings.

13. The method of claim 12, wherein obtaining the plurality of training indications comprises:

obtaining a plurality of resource parameter sets, wherein each resource parameter set of the plurality of resource parameter sets includes a corresponding set of numerical values associated with a particular resource of the one or more resources; and storing the plurality of resource parameter sets as the plurality of training indications.

14. The method of claim 2, further comprising:

determining that a first embedding of the first plurality of embeddings matches a second embedding of the second plurality of embeddings;

based on determining that the first embedding of the first plurality of embeddings matches the second embedding of the second plurality of embeddings, providing the first embedding to the machine learning model in lieu of providing the second embedding to the machine learning model; and generating, using the machine learning model based on the first embedding, the one or more parameter sets for the user.

15. The method of claim 14, wherein determining that the first embedding matches the second embedding comprises:

determining a distance between the first embedding and the second embedding, wherein the distance indicates a similarity of the first embedding and the second embedding in the same embedding space;

comparing the distance with a threshold distance; and based on determining that the distance is less than the threshold distance, determining that the first embedding matches the second embedding.

16. One or more non-transitory, computer-readable media storing instructions that, when executed by one or more processors, cause operations comprising:

transmitting, to a device associated with a user, a request for a first parameter set, wherein the first parameter set comprises restricted parameters;

in response to the request for the first parameter set, causing a first plurality of embeddings to be generated using an embedding model, wherein each embedding of the first plurality of embeddings represents a corresponding restricted parameter that is inaccessible;

retrieving a second parameter set associated with the user;

providing the second parameter set to a duplicate embedding model for generating a second plurality of embeddings, wherein each embedding of the second plurality of embeddings is in a same embedding space as the first plurality of embeddings;

generating, using a machine learning model based on the first plurality of embeddings and the second plurality of embeddings, one or more parameter sets for the user, wherein each parameter set of the one or more parameter sets represents resource parameters of a corresponding resource; and generating, for display on the device associated with the user, one or more indications corresponding to one or more resources associated with the one or more parameter sets.

17. The one or more non-transitory, computer-readable media of claim 16, wherein the instructions cause operations further comprising:

transmitting to the device associated with the user the one or more indications; and based on receiving from the device associated with the user a selection of a first indication of the one or more indications, providing, for the user, access to a first resource associated with the first indication.

18. The one or more non-transitory, computer-readable media of claim 16, wherein each embedding within the first plurality of embeddings is in a format that does not enable that embedding to be transformed back into the corresponding restricted parameter.

19. The one or more non-transitory, computer-readable media of claim 16, wherein the instructions cause operations further comprising combining the first plurality of embeddings and the second plurality of embeddings into an embedding dataset.

20. The one or more non-transitory, computer-readable media of claim 16, wherein the instructions for causing the first plurality of embeddings to be generated using the embedding model associated with the user cause operations further comprising:

receiving in response to the request the first plurality of embeddings, wherein the first plurality of embeddings is generated by the device associated with the user using the embedding model.

* * * * *